(12) United States Patent
Barrett et al.

(10) Patent No.: US 8,051,445 B2
(45) Date of Patent: Nov. 1, 2011

(54) ADVERTISEMENT INSERTION

(75) Inventors: Peter T. Barrett, San Francisco, CA (US); David L. de Heer, Woodside, CA (US); Edward A. Ludvig, Redwood City, CA (US)

(73) Assignee: Microsoft Corporation, Redmond, WA (US)

( * ) Notice: Subject to any disclaimer, the term of this patent is extended or adjusted under 35 U.S.C. 154(b) by 549 days.

(21) Appl. No.: 12/024,044

(22) Filed: Jan. 31, 2008

(65) Prior Publication Data

US 2009/0199236 A1      Aug. 6, 2009

(51) Int. Cl.
*H04N 7/16* (2011.01)
*H04N 7/10* (2006.01)
*H04N 7/025* (2006.01)

(52) U.S. Cl. .............. 725/36; 725/1; 725/32; 725/33; 725/34; 725/35

(58) Field of Classification Search ............ 725/36
See application file for complete search history.

(56) References Cited

U.S. PATENT DOCUMENTS

| | | | |
|---|---|---|---|
| 6,487,721 B1 * | 11/2002 | Safadi | 725/36 |
| 6,684,249 B1 * | 1/2004 | Frerichs et al. | 709/225 |
| 6,970,461 B2 * | 11/2005 | Unitt et al. | 370/390 |
| 2002/0144265 A1 * | 10/2002 | Connelly | 725/39 |
| 2003/0101454 A1 * | 5/2003 | Ozer et al. | 725/42 |
| 2003/0177490 A1 * | 9/2003 | Hoshino et al. | 725/34 |
| 2004/0045030 A1 * | 3/2004 | Reynolds et al. | 725/110 |
| 2005/0078177 A1 * | 4/2005 | Gotanda | 348/114 |
| 2005/0083970 A1 * | 4/2005 | Glickman et al. | 370/466 |
| 2007/0083885 A1 * | 4/2007 | Harding | 725/34 |
| 2007/0107036 A1 * | 5/2007 | Chen et al. | 725/135 |
| 2008/0046924 A1 * | 2/2008 | Hood | 725/36 |
| 2008/0120676 A1 * | 5/2008 | Morad et al. | 725/127 |

* cited by examiner

*Primary Examiner* — Justin E Shepard

(57) ABSTRACT

Advertisement insertion techniques are described. In an implementation, a network operator decrypts a stream of content received from a content provider at a first server. The decrypted stream of content is communicated to an advertisement splicer, which locates one or more advertisement insertion points in the decrypted stream of content. One or more advertisements are then inserted in the located one or more advertisement insertion points. The decrypted stream of content having the inserted one or more advertisements to a second server, which encrypts the decrypted stream of content having the inserted one or more advertisements. The encrypted stream of content having the inserted one or more advertisements is emitted to be communicated to one or more clients for output.

18 Claims, 4 Drawing Sheets

ADVERTISEMENT INSERTION

BACKGROUND

Traditional television is supported in large part through provision of advertisements. Advertising may be inserted into television channels by a variety of entities including content providers, local affiliates, pay TV network operators, and so on.

Content deals between content providers and pay television network operators, for instance, typically include the rights for the operator to insert advertisements at predetermined times. These advertisements have typically been inserted on a per-market basis (since pay television operators have historically operated as a per-market business). These advertising opportunities are called "avails," and the ones that are inserted on a per-market basis are generally referred to as "local avails."

Non-broadcast-oriented television distribution systems (e.g. those that distribute content over packet-switched IP networks), however, have characteristics that differ from those of traditional television network. For example, non-broadcast-oriented television distribution systems typically encrypt the content at the source before distributing the content over the network, e.g., to prevent content theft.

Non-broadcast-oriented television distribution systems (e.g., IP-based distribution networks) are also different from traditional broadcast-oriented television distribution systems in that clients on packet-switched networks have equal access to each content stream. Broadcast and cable distribution, however, use physical bottlenecks (e.g. geography or cable topography) to limit client access to only those content streams that are geographically relevant. Thus, some techniques that are used to solve encryption and content distribution in a traditional television content distribution system are not applicable in an IP-based distribution system

SUMMARY

Advertisement insertion techniques are described. In an implementation, a network operator decrypts a stream of content received from a content provider at a first server. The decrypted stream of content is communicated to an advertisement splicer, which locates one or more advertisement insertion points in the decrypted stream of content. One or more advertisements are then inserted in the located one or more advertisement insertion points. The decrypted stream of content having the inserted one or more advertisements to a second server, which encrypts the decrypted stream of content having the inserted one or more advertisements. The encrypted stream of content having the inserted one or more advertisements is emitted to be communicated to one or more clients for output.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Overview

Figure 1:
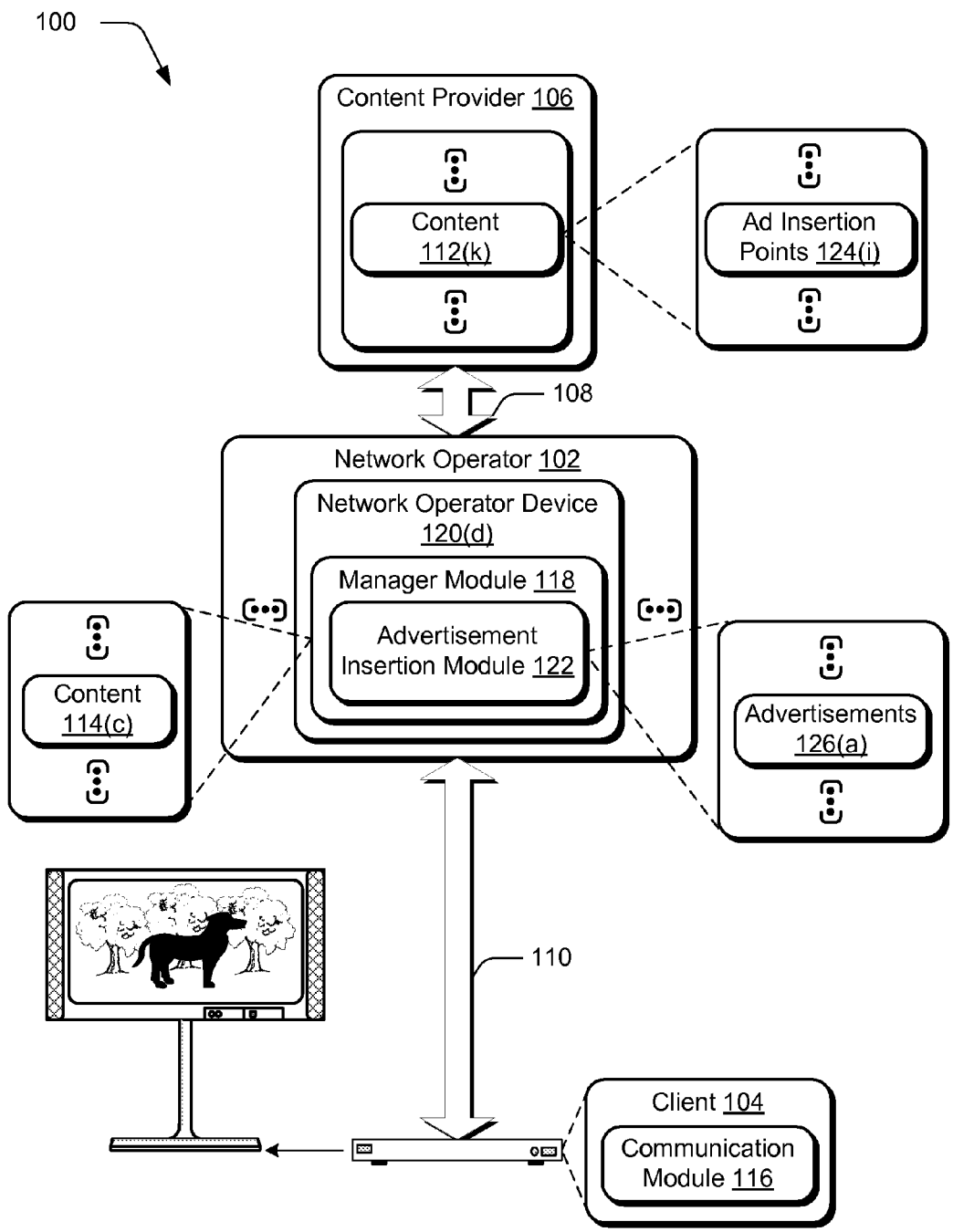
FIG. 1 is an illustration of an environment in an exemplary implementation that is operable to employ local advertisement insertion techniques.

Advertisement revenue continues to be one of the major components of business models used to distribute content, such as television programming, to clients. For example, traditional television programming was provided by a "national" content provider which embedded advertisements in the content which was used to help "pay" for provision of the television programming. This television programming was then propagated to network operators for distribution to households, (e.g., via one or more head ends). The network operators also inserted advertisements into the television programming to collect revenue, and then distributed the television programming to clients.

The transfer of the television programming from the content provider to the network operator and then to the clients, however, was performed using dedicated and expensive equipment that created a network specifically designed for such transfer. Therefore, techniques that were developed to deliver the content (e.g., television programming) "outside" of this network did not achieve the functionality of the traditional network.

Advertisement insertion techniques are described. In an implementation, techniques are described that may be employed by an Internet Protocol (IP) network, e.g., the Internet, to deliver content to clients with local advertisements. For example, a network operator may employ a device to receive, decrypt, and depacketize content received via an IP network. This content may then be provided to an advertisement splicer to insert local advertisements. In this way, the advertisement splicer is not "aware" of the techniques used to decrypt and/or depacketize the content, thereby enabling use of a "third party" advertisement splicer without disclosing encryption and transport techniques used with the content to the third party. The content having the inserted advertisements may then be encrypted and communicated over a network (e.g., the Internet) to one or more clients. In this way, network operators that wish to expand to provide television programming over an IP network, e.g., "Telco" operators using digital subscriber lines, may still leverage revenue from local advertisement insertion that is currently available from more traditional network operators, such as cable providers. A variety of other examples are also contemplated, further discussion of which may be found in relation to the following sections. For example, although geographic distinctions are discussed in the following sections, this distinction is for discussion purposes alone. For instance, the "local" advertisements may be served to groups of client based on other criteria than geography, such as demographic criteria.

In the following discussion, an exemplary environment is first described that is operable to provide local advertisement insertion techniques. Exemplary procedures are then described which may be employed in the exemplary environment, as well as in other environments. Although in the following discussion a television environment is used as an example, it should be readily apparent that the environment may support a wide variety of content without departing from the spirit and scope thereof.

Exemplary Environment

FIG. 1 is an illustration of an environment 100 in an exemplary implementation that is operable to employ local advertisement insertion techniques. The illustrated environment 100 includes a network operator 102, a client 104 and a content provider 106 that are communicatively coupled via network connections 108, 110. Although a single entity is shown, respectively for the network operator 102, the client 104, and the content provider 106 in FIG. 1, it should be readily apparent that each of these illustrated entities may also be representative of a plurality of entities without departing from the spirit and scope thereof.

The client 104 may be configured in a variety of ways. For example, the client 104 may be configured as a computer that is capable of communicating over the network connection 110, such as a desktop computer, a mobile station, an entertainment appliance, a set-top box communicatively coupled to a display device as shown, a wireless phone, a game console, and so forth. For purposes of the following discussion, the client 104 may also relate to an entity that operates the client. In other words, client 104 may describe logical clients that include users, software and/or devices.

The network connections 108, 110 may assume a wide variety of configurations. For example, network connection 110 may include a wide area network (WAN), a local area network (LAN), a wireless network, a public telephone network, an intranet, a broadcast network with backchannel communication, and so on. The network connection 110, for instance, may be implemented via an Internet Protocol (IP) network using packet-switching techniques.

The content provider 106 includes one or more items of content 112(k), where "k" can be any integer from 1 to "K". The content 112(k) may include a variety of data, such as television programming. The content 112(k) is communicated over the network connection 108 to the network operator 102.

Content 112(k) communicated via the network connection 110 is received by the network operator 102 and may be stored as one or more items of content 114(c), where "c" may be an integer from one to "C". The content 114(c) may be the same as or different from the content 112(k) received from the content provider 106. The content 114(c), for instance, may include additional data for broadcast to the client 104, such as electronic program guide (EPG) data. The content 114(c) may also be representative of content that is streamed from the content provider 106 through an infrastructure of the network operator 102 to the client 104.

The client 104, as previously stated, may be configured in a variety of ways to receive the content 114(c) over the network connection 110, such as to immediately output the content 114(c) as it is received and/or record the content 114(c) for later output using one or more "time shifting" techniques, e.g., when configured as a digital video recorder (DVR) to pause, rewind and/or fast forward an output of the content 114(c) when stored locally at the client 104 and/or remotely at the network operator as in a network DVR (NDVR) example.

The client 104 typically includes hardware and software to transport and decrypt content 114(c) received from the network operator 102 for rendering by the illustrated display device.

The client 104 includes a communication module 116 that is representative of functionality on the client 104 to control content playback on the client 104, such as to tune to particular channels, purchase pay-per-view content, through the use of one or more "command modes", and so on. The command modes may provide non-linear playback of the content 114(c) (i.e., time shift the playback of the content 114(c)) such as pause, rewind, fast forward, slow motion playback, and the like.

The network operator 102 is illustrated as including a manager module 118 on one or more network operator devices 120(d), where "d" may be an integer between one and "D". The manager module 118 is representative of functionality to configure content 114(c) for output (e.g., streaming) over the network connection 110 to the client 104. The manager module 118, for instance, may configure content 112(k) received from the content provider 106 to be suitable for transmission over the network connection 110, such as to "packetize" the content for distribution over the Internet, configuration for a particular broadcast channel, map the content 112(k) to particular channels, and so on.

Thus, in the environment 100 of FIG. 1, the content provider 106 may broadcast the content 112(k) over a network connection 108 to a multiplicity of network operators, an example of which is illustrated as network operator 102. The network operator 102 may then stream the content 114(c) over a network connection 110 to a multitude of clients, an example of which is illustrated as client 104. The client 104 may then output the content 114(c) immediately and/or store the content 114(c) in a storage device, such as when the client 104 is configured to include digital video recorder (DVR) functionality.

The manager module 118 is illustrated as including an advertisement insertion module 122 that is representative of functionality to insert advertisements into the content 114(c). For example, the content 112(k) provided by the content provider 106 may have one or more advertisement (ad) insertion points 124(i), where "i" may be an integer between one and "I". The ad insertion points 124(i) may be used by the network operator 102 (as represented by the advertisement insertion module 122) to insert one or more advertisements 126(a) in the content 114(c). In an implementation, the content 112(k) provided by the content provider 106 may also include one or more advertisements that were embedded by the content provider 106. Thus, the content 114(c) provided to the client 104 may include advertisements from the content provider 106 and/or the client 104.

A variety of different devices (as represented by network operator device 120(d)) may be used by the network operator 102 to embed the advertisements 126(a). Accordingly, the functionality represented by the advertisement insertion module 122 (as well as the manager module 118) may be distributed across these devices, further discussion of which may be found in relation to the following figure.

Figure 2:
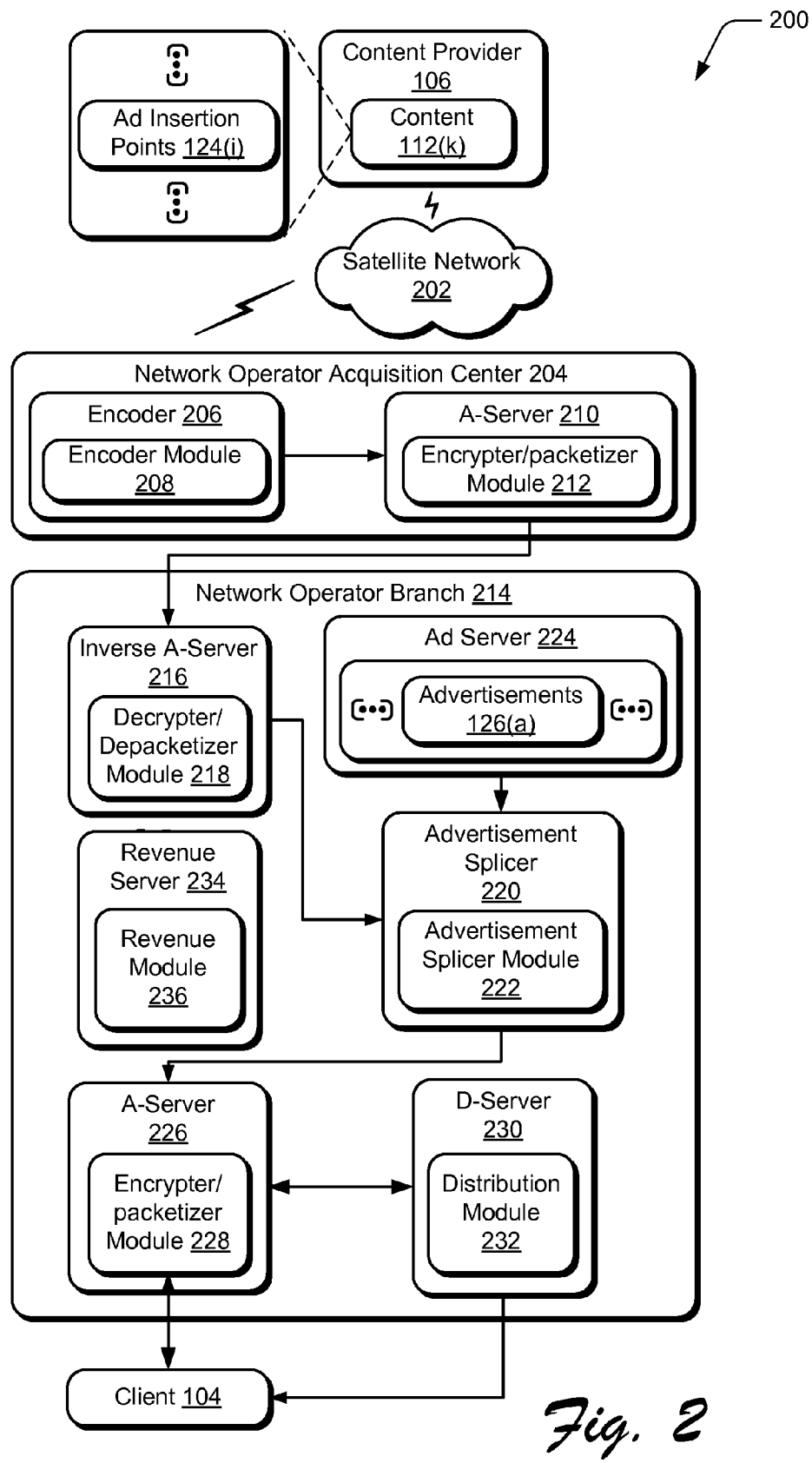
FIG. 2 is an illustration of an exemplary system showing a network operator of FIG. 1 in greater detail as being in communication with a content provider and client of FIG. 1 via one or more Internet Protocol (IP) networks.

FIG. 2 depicts an exemplary system 200 showing the network operator 102 of FIG. 1 in greater detail as being in communication with the content provider 106 and the client 104 of FIG. 1 via one or more Internet Protocol (IP) networks.

The content provider 106 as illustrated in FIG. 2 sends the content 112(k) over a network implemented as a satellite network 202, e.g., via satellite uplink/downlink. The content 112(k) in the illustrated implementation is communicated as a stream of audio/visual data carried in accordance with one or more MPEG transport protocols. Included in this transport are signals for ad insertion points 124(*i*).

The content provider's signal may be received by several network operators, e.g., the network operator 102 of FIG. 1 which is illustrated as being implemented in FIG. 2 via a collection of devices. For instance, the content provider 106 may not be optimized for a particular operator's network. Consequently, the network operator 102 of FIG. 1 may receive and decode the signal at a network operator acquisition center 204 using a device called a IRD for "integrated receiver-decoder", whose output is sent to an encoder 206 which is illustrated as having an encoder module 208. The encoder 206 and the encoder module 208 are representative of functionality to reformat and recompress the signal into one that's optimized for the particular operator's network. Optimization considerations may include compression scheme that is supported by clients 104 on the network, the amount of data bandwidth the network operator 102 wants to expend for the channel in question, and the distance between I frames, and so on.

Once the signal has been encoded, it is ingested into the system by a video acquisition server, which is illustrated as an Aserver 210 having the encrypter/packetizer module 212 in FIG. 2. The Aserver 210 acquires timing for the video stream and encapsulates the video stream into IP packets through use of the encrypter/packetizer module 212. The encrypter/packetizer module 212 is also representative of functionality to encrypt the stream and add digital rights management (DRM) information. The Aserver 210 may then multicast the packetized, DRM stream to downstream devices of the network operator 102. Finally, the Aserver 210 provides retransmission packets that are missing and/or have errors for those downstream devices.

The output of the Aserver 210 may go to two classes of consumers. In a first class, the output may form a multicast steam that is received by each client 102. In a second class, the signals are used by a set of servers in a location that is geographically closer to interesting groups of clients, which may be referred to as a network operator branch 214.

At the network operator branch 214, the multicast stream goes to a device in the branch that is referred to as an inverse A server 216 having a decrypter/depacketizer module 218. The inverse A server 216 basically reverses the processing performed by the Aserver 210. To do this, the inverse Aserver 216 starts with an in-order and error-corrected stream. As such, the inverse A-server 216 serves as a client to the error-correction-retransmission services of the upstream Aserver 210. Next, the inverse Aserver 216 removes the IP packetization and encryption from the video stream to yield an MPEG-compliant, de-jittered, in-the-clear transport stream for use by an advertisement splicer 220 having an advertisement splicer module 222.

The advertisement splicer 220 and the advertisement splicer module 222 are representative of functionality to take the standard transport stream from the inverse A-server 216 and inserts local advertisements 126(*a*) from an advertisement server 224 as signaled by the in-band signals applied by the content provider 106. The advertisement server 224 looks up if the operator has an advertisement 126(*a*) scheduled for the indicated ad avail, and, if so, passes the advertisement 126(*a*) back to the advertisement splicer 220. The advertisement splicer 220 then inserts the advertisement 126(*a*) into the stream, replacing the video that is sent from the content provider 106.

The spliced stream is then re-acquired by the IPTV system using a local Aserver 226 having an encrypter/packetizer module 228 at the network operator branch 214. In an implementation, this Aserver 226 is capable of performing functions similar to those of the A-server 210 at the network operator acquisition center 204, except it does those functions on the locally-spliced version of the stream. In general, there are as many locally spliced versions of the stream as there are markets or market zones into which the network operator 102 can profitably sell local advertisement time. For example, a national video operator may serve sixty or more market areas, and each market can have from 1 to about 50 zones within the market area. Note that in a packet-switched environment, the concept of market areas and zones may be more abstract than what is defined purely by geography.

The output of the Aserver 226 is multicast to downstream devices. These include one or more clients 104 that are within the zones for which the stream of interest has been spliced. Another set of devices that may use the Aserver's 226 streams are represented by the Dserver 230 having the distribution module 232. The Dserver 230 and the distribution module 232 are representative of functionality to scale operation of the A-server 226, which may include error-correction-and-retransmission proxies for the Aserver 226 to the client 104. Foir example, since many client 104 (e.g., millions) may be connected to a single multicast service, the D-server 230 may assist the network operator branch 214 in handling retransmission requests from the full set of clients 104. A variety of other examples are also contemplated.

Additionally, the system 200 is illustrated as including a revenue server 234 and a revenue module 236 that are representative of functionality to collect revenue from one or more advertisers for insertion of the advertisements 126(*a*) into the content. Although the revenue server 234 is not illustrated as being connected to the other devices of the network operator 102, the revenue server 234 may be connected in a variety of ways. For example, the revenue server 34 may be communicatively coupled with the ad server 224 such that a fee is collected when the advertisement 126(*a*) is collected from an advertiser, e.g., a storage fee. In another example, the revenue server 234 may be communicatively coupled with the advertisement splicer 220 such that when an advertisement 126(*a*) is served, revenue is collected from a respective advertiser. In a further example, the revenue server 234 may be connected with the A-server 226 that when content 112(*k*) having the advertisement 126(*a*) is distributed, revenue is collected from respective advertisers. A wide variety of other examples are also contemplated.

Generally, any of the functions described herein can be implemented using software, firmware (e.g., fixed logic circuitry), manual processing, or a combination of these implementations. The terms "module," "functionality," and "logic" as used herein generally represent software, firmware, or a combination of software and firmware. In the case of a software implementation, the module, functionality, or logic represents program code that performs specified tasks when executed on a processor (e.g., CPU or CPUs). The program code can be stored in one or more computer readable memory devices. The features of the local advertisement insertion techniques described below are platform-independent, meaning that the techniques may be implemented on a variety of commercial computing platforms having a variety of processors.

Exemplary Procedures

The following discussion describes advertisement insertion techniques that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference will be made to the environment 100 of FIG. 1 and the system 200 of FIG. 2.

Figure 3:
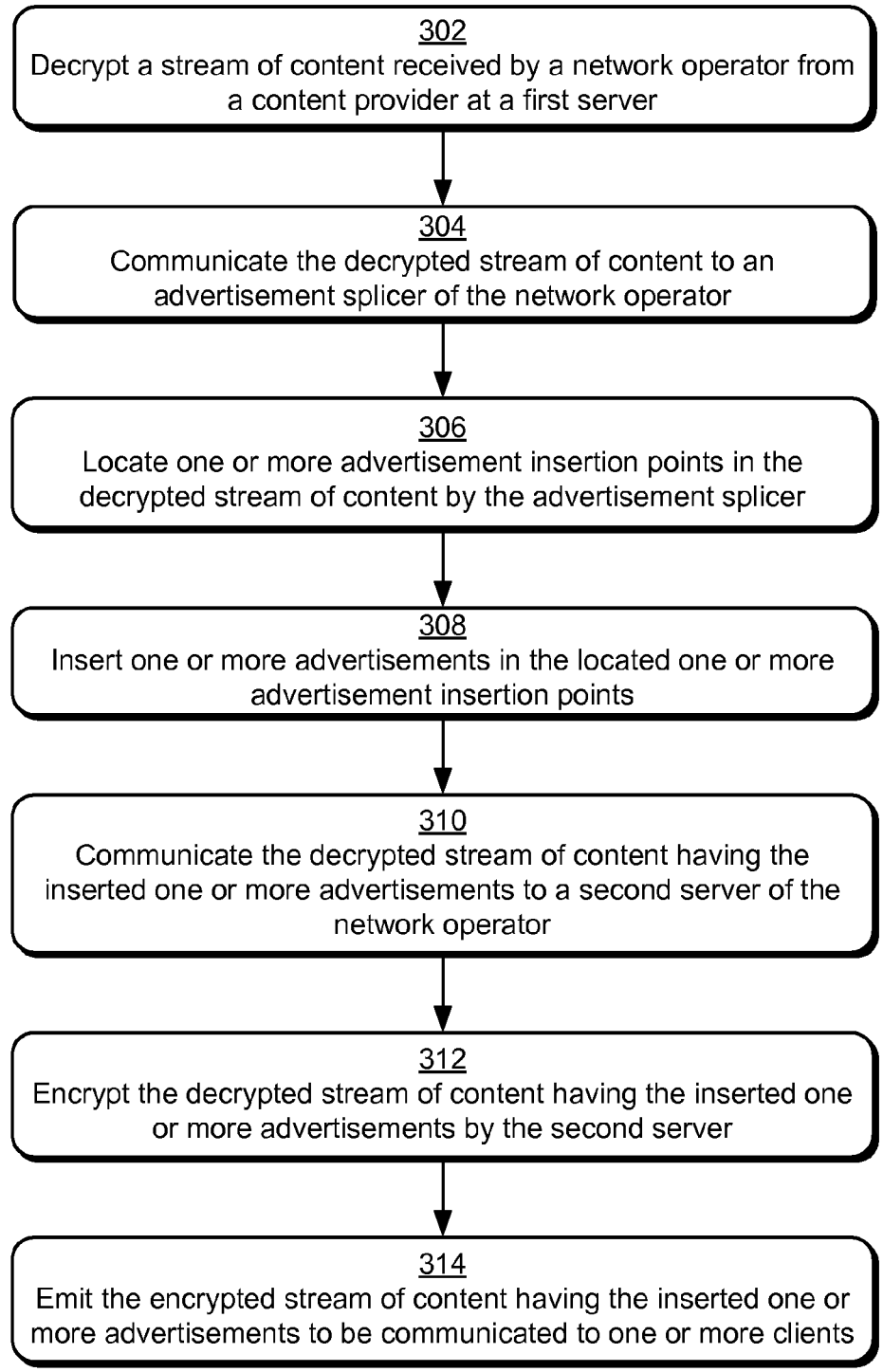
FIG. 3 is a flow diagram depicting a procedure in an exemplary implementation in which one or more advertisements are inserted into a stream of content at ad insertion points located by an advertisement splicer.

FIG. 3 depicts a procedure 300 in an exemplary implementation in which one or more advertisements are inserted into a stream of content at ad insertion points located by an advertisement splicer 214. A stream of content received by a network operator from a content provider at a first server is decrypted (block 302). For example, the network operator 102 may receive content 112(k) from the content provider 106 over an IP network, such as the Internet. The network operator 102, by leveraging functionality of the inverse A-server 216 and respective decrypter/depacketizer module 218 may remove encryption (i.e., decrypt) used to protect the content 112(k) and return the content 112(k) to a form that is "understood" by an advertisement splicer 220.

The decrypted stream of content is communicated to an advertisement splicer 220 of the network operator 102 (block 304). The A-server 216, for instance, may stream the content 112(k) using an MPEG TS UDP multicast, although a variety of other techniques are also contemplated.

The advertisement splicer 220, upon receipt of the content 112(k), may locate one or more advertisement insertion points in the decrypted stream of content by the advertisement splicer (block 306). For example, the advertisement splicer 220 may locate tags in a stream of the content 112(k) or use a variety of other techniques to determine "where" in an output of the content 112(k) the advertisements 126(a) are to be inserted. As previously described, because the encryption and other propriety techniques used to transport the content 112(k) have been removed by the inverse A-server 216 and decrypter/depacketizer module 218, a third party advertisement splicer may be used that is not "aware" of the encryption and/or decryption techniques.

One or more advertisements are then inserted into the located one or more advertisement insertion points (block 308). The network operator 102, for instance, may receive the advertisements 126(a) over a network connection, e.g., via a web interface and so on. The advertisements 126(a) may then be stored by an advertisement server 224 by the network operator 102 until insertion by the advertisement splicer 214, e.g., into portions of the stream of content 112(k) having corresponding tags. A variety of other examples are also contemplated, such as to insert the advertisements dynamically in real time as a stream of the content 112(k) is received.

The decrypted stream of content having the inserted one or more advertisements are communicated to a second server of the network operator (block 310). For example, the advertisement splicer 220 may stream the content 112(k) having the advertisements 126(a) using an MPEG TS UDP multicast, although a variety of other techniques are also contemplated.

The decrypted stream of content having the inserted one or more advertisements are encrypted by the second server (block 312). The A-server 226, for instance, may employ a encrypter/packetizer module 228 to encrypt the content 112(k) having the advertisements 126(a) for distribution over an IP network to the client 104.

The encrypted stream of content having the inserted one or more advertisements is emitted for communication to one or more client (block 314). For example, when the network operator 102 is configured as a telephone operator the content 112(k) may be streamed over a digital subscriber line (DSL) network in accordance with MPEG2-TS RFC 2250. Thus, like before, the advertisement splicer 220 need not be aware of additional processing techniques used to configure the content 112(k) for transport. Thus, a variety of different "third party" advertisement splicers may be leveraged by the network operator 102 without disclosing propriety techniques of the network operator 102. A variety of other examples are also contemplated.

Figure 4:
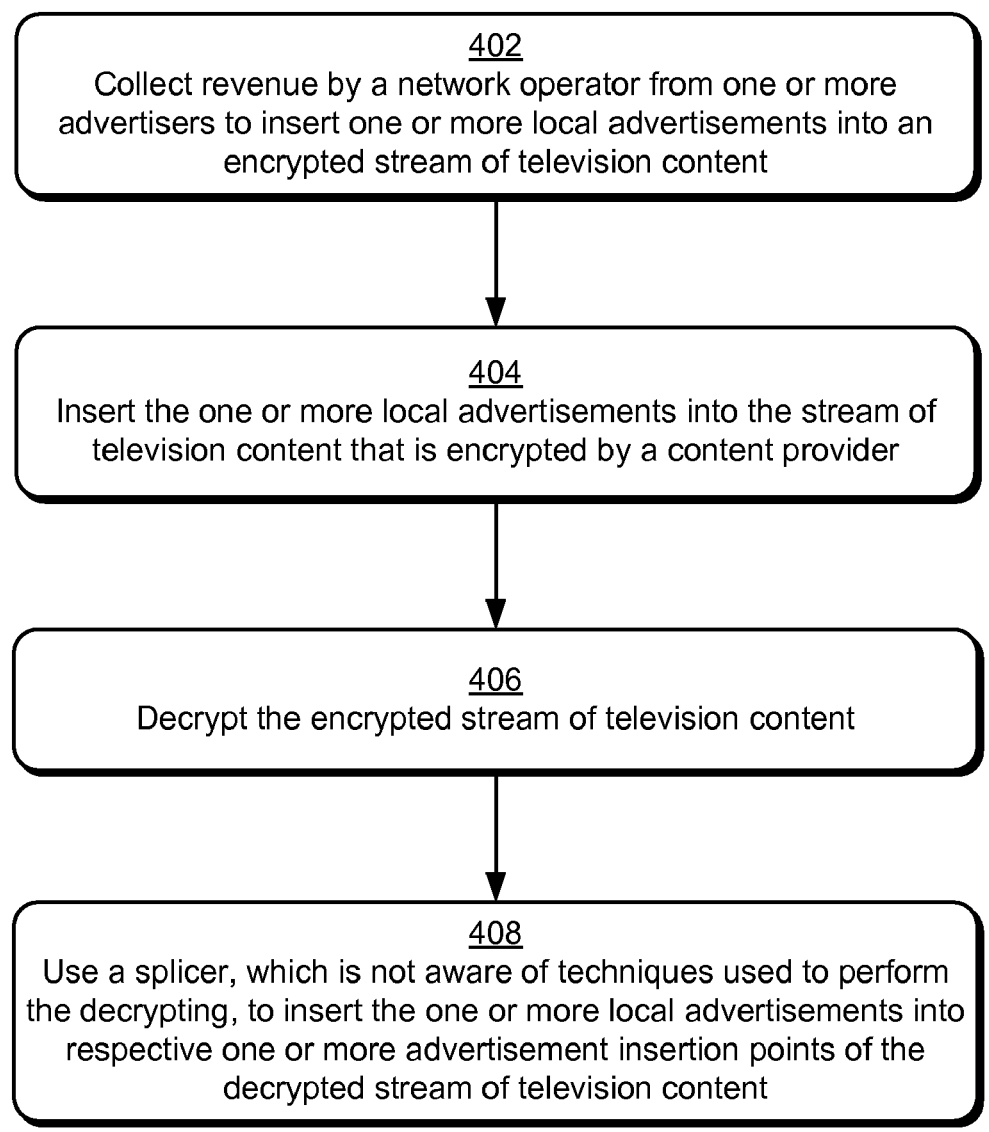
FIG. 4 is a flow diagram depicting a procedure in an exemplary implementation in which revenue is collected to insert local advertisements into an encrypted stream of television content.

FIG. 4 depicts a procedure 400 in an exemplary implementation in which revenue is collected to insert local advertisements into an encrypted stream of television content. Revenue is collected by a network operator from one or more advertisers to insert one or more local advertisements into an encrypted stream of television content (block 402). The network operator 102, for instance, may provide a web interface accessible via the Internet to advertisers to submit advertisements 126(a). The revenue server 234 and the revenue module 236 may then track this receipt and collect revenue based on the parameters of an agreement between the network operator 102 and the advertiser.

The one or more local advertisements are inserted into the stream of television content that is encrypted by a content provider (block 404). This insertion may be performed in a variety of ways.

The encrypted stream of television content, for instance, may be decrypted (block 406). An advertisement splicer, which is not aware of techniques used to perform the decrypting, may then be used to insert the one or more local advertisements into respective one or more advertisement insertion points of the decrypted stream of television content (block 406). A variety of other examples are also contemplated, one or more of which was described in relation to the previous figures.

CONCLUSION

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

What is claimed is:

1. A method comprising:
at a network operator of an Internet Protocol (IP) network:
decrypting a stream of content received from a content provider by a first server, the stream of content being received as packetized content from a content provider that is compressed for the IP network based at least partially on compression schemes supported by one or more clients;
communicating the decrypted stream of content from the first server to an advertisement splicer;
locating one or more advertisement insertion points in the decrypted stream of content;
determining whether advertisements are scheduled for the located one or more advertisement insertion points;
in response to determining that one or more of the advertisements are scheduled for the located one or more advertisement insertion points, inserting the one or more scheduled advertisements in the located one or more advertisement insertion points to replace content from the content provider, and not inserting one or more of the advertisements that are not scheduled for the located one or more advertisement insertion points;
in response to inserting the one or more scheduled advertisements, implementing techniques that initiate a revenue server to collect revenue from one or more advertisers that provided the one or more scheduled advertisements that were inserted;

communicating the decrypted stream of content having the inserted one or more scheduled advertisements to a second server;

encrypting the decrypted stream of content having the inserted one or more scheduled advertisements; and emitting the encrypted stream of content having the inserted one or more scheduled advertisements to be communicated to the one or more clients for output.

2. A method as described in claim 1, wherein the first server is further configured to depacketize the stream of content received via the IP network.

3. A method as described in claim 1, wherein the communicating of the decrypted stream of content to the advertisement splicer and the communicating of the decrypted stream of content having the inserted one or more scheduled advertisements to the second server is performed via streaming in accordance with a Motion Picture Experts Group (MPEG) Transport Stream (TS) User Datagram Protocol (UDP) multicast.

4. A method as described in claim 1, wherein the emitting of the encrypted stream of content includes packetizing the encrypted stream of content for communication using the IP network to the one or more clients.

5. A method as described in claim 1, wherein the encrypting of the decrypted stream of content uses at least one encryption technique that is not used in conjunction with the communicating of the decrypted stream of content to the advertisement splicer or the communicating of the decrypted stream of content having the inserted one or more scheduled advertisements to the second server.

6. A method as described in claim 1, wherein the content received from the content provider at the first server includes at least one advertisement.

7. A method as described in claim 6, wherein:
the at least one advertisement is a national advertisement; and
the one or more scheduled advertisements inserted in the located one or more advertisements insertion points are local advertisements.

8. A method as described in claim 1, wherein the advertisements are scheduled based on one or more criteria other than geography.

9. A method as described in claim 1, further comprising receiving the one or more scheduled advertisements by the advertisement splicer over the IP network.

10. A method comprising:
collecting revenue by a network operator of an Internet Protocol (IP) network from one or more advertisers to insert local advertisements into an encrypted stream of television content that is compressed for the IP network based at least partially on compression schemes supported by one or more clients;

determining whether the local advertisements are scheduled for one or more advertisement insertion points of the stream of television content; and in response to determining that one or more of the local advertisements are scheduled for the one or more advertisement insertion points, inserting the one or more scheduled local advertisements into the encrypted stream of television content received as packetized content from a content provider by decrypting the encrypted stream of television content and using a third party advertisement splicer, which is not aware of techniques used to perform the decrypting, to insert the one or more scheduled local advertisements into respective one or more advertisement insertion points of the stream of television content to replace content from a content provider, and not inserting one or more of the local advertisements that are not scheduled for the located one or more advertisement insertion points.

11. A method as described in claim 10, wherein the encrypted stream of television content includes at least one advertisement that is embedded by the content provider that provided the encrypted stream of television content to the network operator.

12. A method as described in claim 10, wherein the third party advertisement splicer is incapable of performing encryption or decryption techniques.

13. A method as described in claim 10, further comprising emitting the stream of content having the inserted one or more scheduled local advertisements to be communicated to one or more clients for output over the IP network.

14. A network operator comprising:
a server to decrypt and depacketize a stream of television content received from a content provider as packetized content that is compressed for an Internet Protocol (IP) network based at least partially on compression schemes supported by one or more clients, and to determine whether advertisements are scheduled for one or more advertisement insertion points of the stream of television content;

an advertisement splicer to insert, in response to determining that one or more of the advertisements are scheduled for the one or more advertisement insertions points, the one or more scheduled advertisements into the one or more advertisement insertion points located in the decrypted stream of television content to replace content from the content provider, and not insert one or more of the advertisements that are not scheduled for the located one or more advertisement insertion points;

a revenue server to initiate, in response to the insertion of the one or more scheduled advertisements, collection of revenue from one or more advertisers that provided the one or more scheduled advertisements that were inserted; and a server to encrypt and packetize the stream of television content having the inserted scheduled one or more advertisements for communication to the one or more clients via the IP network.

15. A network operator as described in claim 14, wherein:
the decryptor and the advertisement splicer communicate, one to another, via one or more transport streams; and
the advertisement splicer and the server communicate, one to another, via one or more transport streams.

16. A network operator as described in claim 14, wherein the advertisement splicer is produced by a third-party and does not incorporate one or more techniques used by the decryptor to decrypt the stream of television content.

17. A network operator as described in claim 14, wherein the advertisement splicer is to receive the one or more scheduled advertisements via a network connection from an advertiser.

18. A network operator as described in claim 14, further comprising a server to communicate a result of the insertion of the one or more scheduled advertisements into the one or more advertisement insertion points to the one or more clients.

* * * * *